June 9, 1964　　　A. E. IEVINS　　　3,136,303
ROTARY ENGINE
Filed Aug. 21, 1961　　　　　　　　　　　4 Sheets-Sheet 1
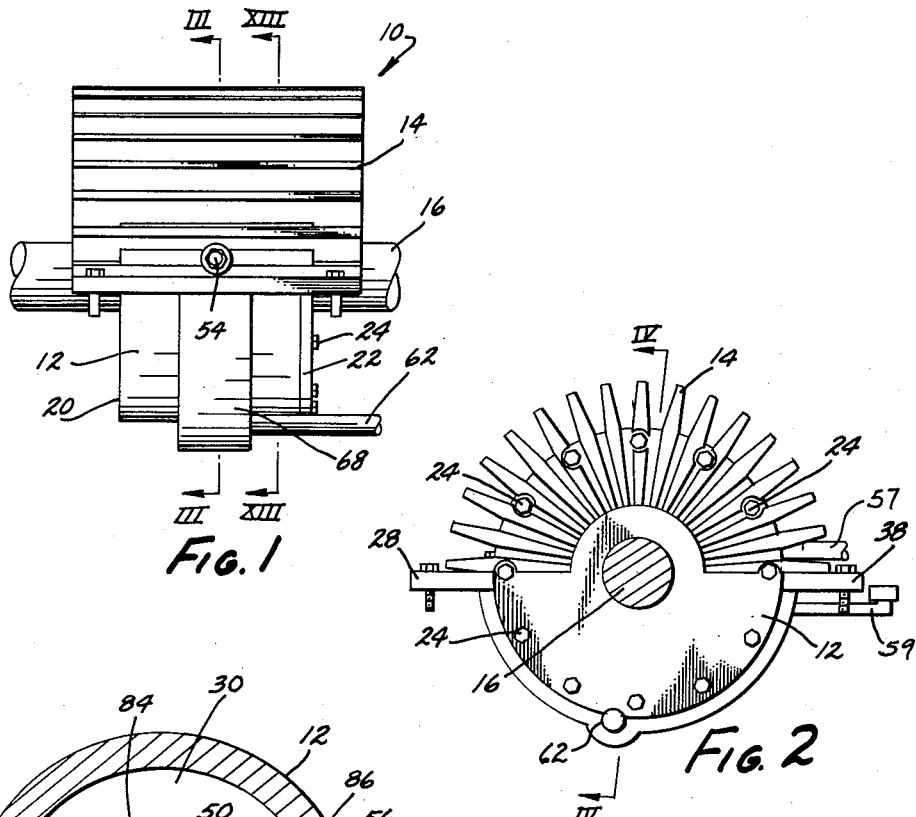
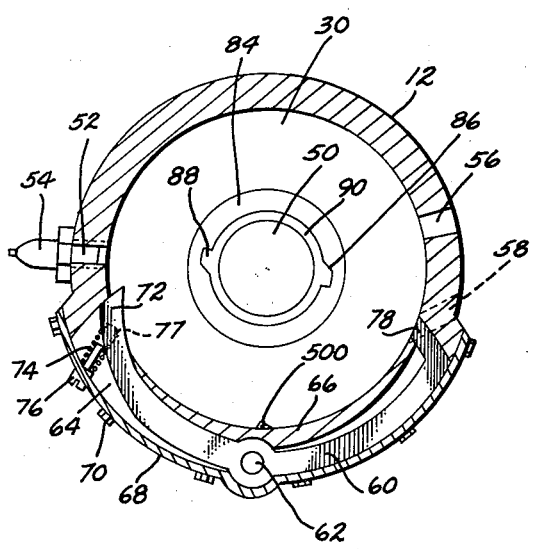
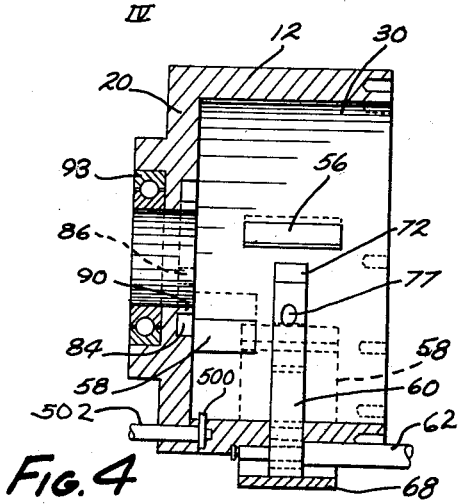
INVENTOR.
ALEKSANDERS E. IEVINS
BY
ATTORNEYS June 9, 1964  A. E. IEVINS  3,136,303
ROTARY ENGINE
Filed Aug. 21, 1961  4 Sheets-Sheet 2

INVENTOR.
ALEKSANDERS E. IEVINS
BY
ATTORNEYS

June 9, 1964  A. E. IEVINS  3,136,303
ROTARY ENGINE
Filed Aug. 21, 1961  4 Sheets-Sheet 3
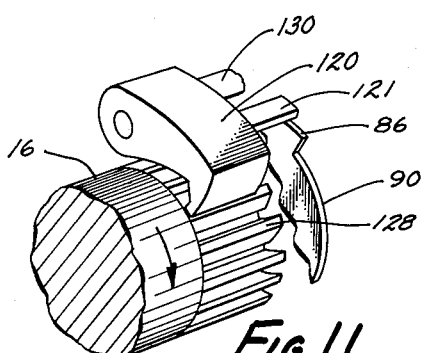
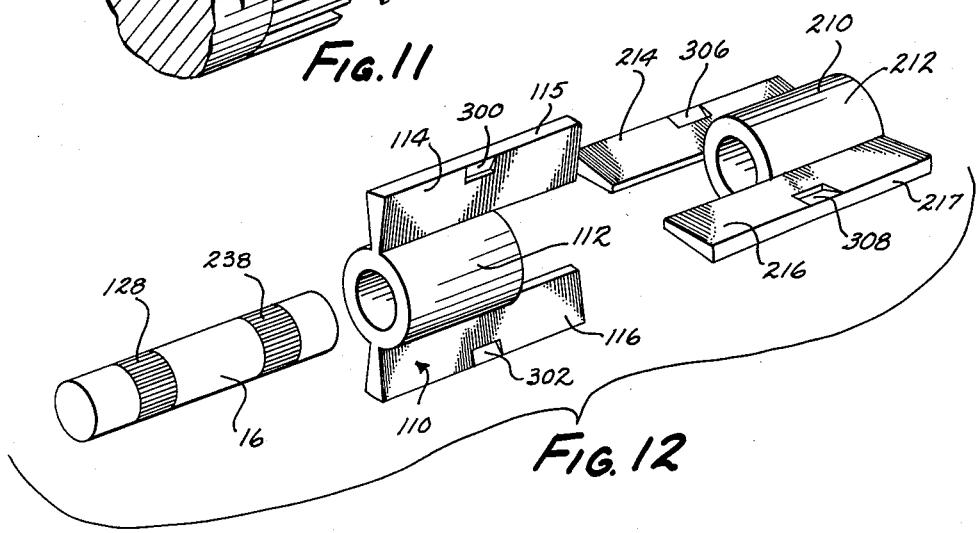
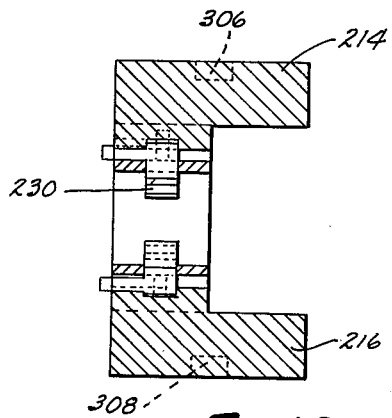
INVENTOR.
ALEKSANDERS E. IEVINS
BY *Price & Heneveld*
ATTORNEYS June 9, 1964 A. E. IEVINS 3,136,303
ROTARY ENGINE Filed Aug. 21, 1961 4 Sheets-Sheet 4

INVENTOR.
ALEKSANDERS E. IEVINS
BY Price & Heneveld
ATTORNEYS

United States Patent Office

3,136,303
Patented June 9, 1964

3,136,303
ROTARY ENGINE
Aleksanders E. Ievins, 542 Lafayette SE.,
Grand Rapids, Mich.
Filed Aug. 21, 1961, Ser. No. 132,703
5 Claims. (Cl. 123—11)

This invention relates to engines, and more particularly to rotary internal combustion engines.

Attempts to alleviate the great multitude of design and engineering problems inherent in reciprocating, piston-type internal combustion engines have oriented efforts to the rotary-type engine. Various forms of rotary engines have been developed including chiefly (1) those having the three-lobed rotor for movement around a three-lobed chamber, (2) those with special rotating abutments, and (3) those with special sliding abutments. In recent years, the multiple lobed variety has received more attention than the movable abutment type since the latter must be so carefully regulated to assure movement of the abutment into and out of the rotor path at exactly the proper times. This regulation becomes especially delicate when adapted to operate at high speeds.

Although the lobed type is usually more satisfactory from the timing aspect, and because of the fewer moving parts necessary, it is relatively expensive to manufacture due to the complex, close tolerance curvatures to be machined on each lobe of the rotor and on each lobe cavity of the cooperating housing. Further, each lobe must be an exact duplicate of the adjacent lobes. Also, the lobe rotor, due to its oscillatory action around the housing, has a tendency to create undesirable vibrations.

Consequently, it has been a goal of forerunners in this field to realize another form of rotary engine which would have the good points of these engines but not the undesirable features. Such an engine would include high volumetric efficiency, would be rugged in operation, would be capable of very high speeds, would not involve delicate supplementary abutment elements, would not require supplemental valving, would be operably smooth in successive driving strokes, would not involve inherent vibrations, would be amenable to installation with a plurality of such engines in an integrated fashion, would be simple in construction, would be dependable, could be quickly and easily repaired and would be relatively inexpensive to manufacture without delicate curvatures to machine or supplemental sliding or rotating abutments to install and regulate.

It is therefore an object of this invention to provide a rotary engine possessing all of the above-mentioned desirable attributes without any of the above-mentioned undesirable characteristics.

It is a further object to provide a rotary engine whereing a plurality of vanes on rotating hubs cooperate with each other such that each vane functions alternately as an abutment and then as the driven element. The engine is capable of large volumetric efficiency since it has four power explosions for each complete rotation of one of the rotary elements composed of a hub and two vanes. The vanes serve both as an abutment, and then as the driven member.

These and many other objects of this invention will be apparent upon studying the following specification in conjunction with the drawings in which:

FIG. 1 is a side elevational view of the novel engine shown in a typical form with air cooling fins;

FIG. 2 is an end elevational view of the engine illustrated in FIG. 1;

FIG. 3 is a sectional view of the engine housing taken on plane III—III of FIG. 1 with the cooling fins, shaft and rotary elements removed;

FIG. 4 is a sectional view of the housing taken on plane IV—IV of FIG. 2 with the cooling fins, shaft, end cap, and rotary elements removed;

FIG. 10 is a sectional view taken on plane X—X of the rotary element illustrated in FIG. 9 with the shaft removed;

FIG. 11 is a fragmentary perspective view of the drive connection between one of the rotary elements and the shaft, including the drive connection release means;

FIG. 12 is an exploded perspective view of the shaft and rotary elements in the engine;

Figure 5:
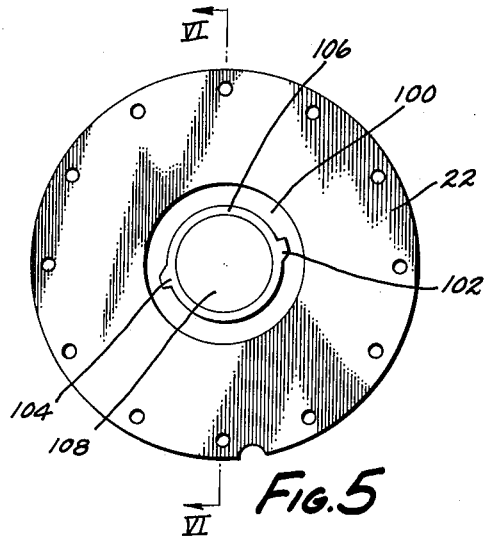
FIG. 5 is an elevational view of the end cap used to close one end of the housing.

Basically, the invention comprises a rotary engine having a cylindrical housing including end walls, a shaft extending through the axial center of the housing, inlet and exhaust ports in the housing, first and second axially arranged and adjacent hubs rotatably mounted on the shaft; a pair of oppositely extending radial vanes on each of the hubs, with each of the vanes extending axially to overlap the adjacent hub to the end wall adjacent the adjacent hub whereby the four vanes define a plurality of four chambers, vane movement control means including a locking catch portion to hold one vane as a temporary abutment, and preferably including a position setting portion to set the position of the driven vane prior to explosion, and said engine also preferably including a positive but releasable drive connection means between each of the hubs and the shaft.

The vane movement control means is preferably a pivotal element, the two ends of which alternately intersect the path of the rotary vane at selected positions to first hold one vane against reverse movement during explosition i.e. as an abutment, and then prior to the next explosion to set the position of the vane about to act as the driven element.

Referring to FIG. 1, the engine 10 there illustrated is shown in a typical form wherein housing 12 includes a plurality of cooling fins 14. This cooling structure may be a water jacket or other suitable means as desired. Housing 12 is generally cylindrical in configuration with a shaft 16 extending axially through the center thereof. One end 20 of the housing 12 may be formed integral with the cylindrical portion. The other end 22 may be a detachable end cap 22 secured to the housing by a plurality of bolts 24. The engine may be mounted to a suitable stand (not shown) by mounting flanges 28 and 38. The cylindrical housing 12 defines an inner cylindrical chamber 30 (FIG. 3) having an axial opening 50 for a shaft, a threaded spark plug opening 52 for a suitable plug 54, exhaust port 56 and inlet port 58. A suitable intake conduit 59 and exhaust pipe 57 may be attached to the housing.

Adjacent the cylindrical chamber 30 in opening 64 between portion 66 of the housing 12 and detachable cover plate 68 secured by bolts 70 is an oscillating control lever or means 60 mounted on pivotal shaft 62. End 72 of this lever is biased into the chamber 30 by coil spring 74 mounted on adjustable stud guide 76 and inserted into recess 77. The opposite end 78 of the lever 60 is normally biased out of the chamber 30 but may move into the chamber upon depression of end 72.

Figure 6:
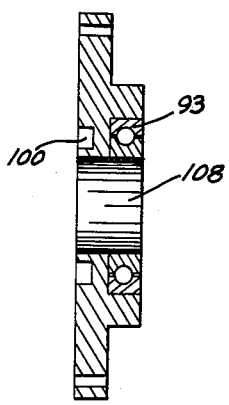
FIG. 6 is a cross sectional view of the end cap taken on plane VI—VI of FIG. 5.

In end 20 of the housing 12 is provided an annular recess 84 into which a suitable pair of camming surfaces 86 and 88 project from annular ring 90. The purpose of these camming surfaces is to disengage the drive connecting means between one rotary element and the drive shaft in a manner to be explained hereinafter. Suitable bearing means 93 is provided in end wall 20 and in end cap 22 for shaft 16. End cap 22 (FIGS. 5 and 6) also includes similar annular recess 100 into which camming surfaces 102 and 104 project from annular ring 106 around the axial shaft opening 108. These camming surfaces disengage the driving connection between the second rotary element and the shaft in a manner to be explained hereinafter.

Figure 7:
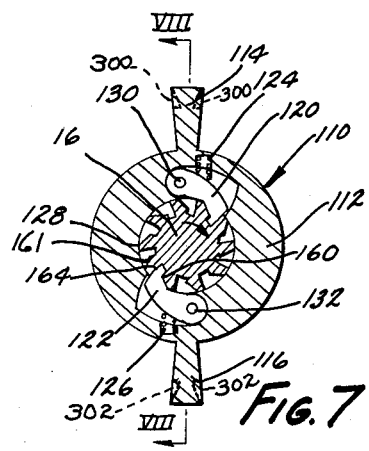
FIG. 7 is an end elevational view of one of the rotary elements including its hub and vanes and its drive connection to the rotary shaft.
Figure 8:
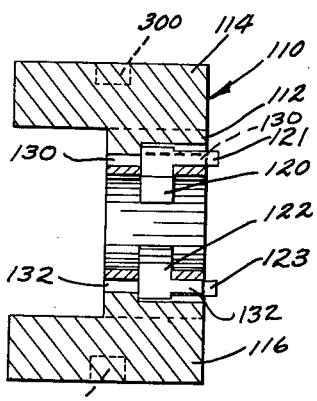
FIG. 8 is a sectional view taken on plane VIII—VIII of FIG. 7 with the shaft removed.

Referring to FIGS. 7 and 8, one of the two rotary elements 110 is there illustrated. It includes hub element 112 and two oppositely positioned, radially directed vane elements 114 and 116. Mounted within the hub 112 is a pawl means for interengagement wth a ratchet means on the shaft. This pawl means is preferably composed of two oppositely positioned and similarly oriented pawls 120 and 122. The use of two pawls is not absolutely necessary for each rotary element, but enables an even distribution of forces. The pawls are biased as by coil springs 124 and 126, toward and into the engaging teeth 128 provided on shaft 16 adjacent the pawls. The pawls are pivotally mounted on pins 130 and 132.

It should be noted that each pawl forms a positive drive connection with the shaft. That is, the pawl is not only capable of imparting a pushing action to the shaft to rotate the shaft, but also, the shaft teeth are able to impart a pulling action to the pawl element when needed and for a reason to be described hereinafter. To accomplish this, each pawl possesses an inner arcuate surface 160 directed generally toward or slightly behind the center of shaft 16 sufficiently so that when engaged with a similar surface on each tooth a firm connection is created to enable the shaft to rotate the pawls and thus the rotary element. Each pawl also contains an outer arcuate surface 164 having substantially the same center of curvature as surface 160 and engageable with a corresponding surface on each tooth to enable the pawl to rotate the shaft. The backside 161 of each tooth is beveled at the top to insure easy engagement between the pawl and teeth without slippage.

Figure 9:
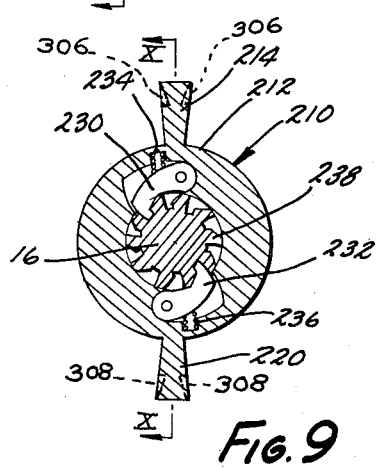
FIG. 9 is an end elevational view of the second rotary element in the engine showing its hub, vanes, and drive connecting means to the shaft.

Cooperating with rotary element 110 is a second rotary element 210, illustrated in FIGS. 9 and 10. This rotary element is likewise composed of a hub 212 and a pair of oppositely positioned, radially extending vanes 214 and 216. This rotary element likewise contains a pair of pawls 230 and 232, biased by coil springs 234 and 236 toward and into engagement with the specially formed teeth 238 on shaft 16. (See FIG. 12 also.) It should be noted that although teeth 238 illustrated in FIG. 9 appear to be oriented in the opposite direction from those teeth 128 illustrated in FIG. 7, this is merely due to the direction of the sectional views of the oppositely facing rotary elements. When the structure is assembled, teeth 128 will be oriented in the same direction as teeth 238 such that the four pawls in the two rotor elements will drive shaft 16 in sequence and in the same direction.

When the rotary elements are assembled on the shaft, hub portions 112 and 212 are brought into adjacent relationship with vanes 114 and 116 on rotary element 110 protruding toward and overlapping hub 212 to extend to both end walls, and vanes 214 and 216 protruding toward and overlapping hub 112 of rotary element 110 to extend between both end walls also. Thus, when shaft 16 is inserted into the rotary elements, teeth 128 will coincide with the hub of the first rotary element 110 and teeth 238 will coincide with the hub of the second rotary element 210.

In each of the side surfaces of each of the vanes on each of the rotary elements is provided a recess adjacent the periphery. Thus, on element 110 a pair of oppositely positioned recesses 300 are formed in vane 114 adjacent the outer edge, and in vane 116 a pair of oppositely positioned recesses 302 are provided. Likewise, on opposite sides of vane 214 adjacent the outer surface are formed a pair of recesses 306, while a similar pair of recesses 308 are provided on opposite sides of vane 216. These recesses receive the respective ends 72 and 78 of the control lever 60 during the operation of the engine in a manner to be described hereinafter.

Each of the pawl elements, mounted on its respective pin to obtain rotative movement, includes an additional cam-surface-engaging arm to disengage the pawl from its spring biased engagement with the ratched teeth. This is illustrated by arm 121 on pawl element 120 and arm 123 on pawl 122 (FIGS. 8 and 11). It is to be understood that the remaining two pawl elements include such arms also and act in the same manner, but are not described in detail for purposes of convenience. Cam follower arm 121 projects laterally and axially from the pawl to ride in recess 84 in the housing 12 (FIG. 3). As rotary element 110 is rotated, pawl 120 will likewise be rotated in the direction indicated by the arrow in FIG. 11. Cam follower surface 121 will ride in recess 84 upon shoulder 90 until cam surface 86 is reached. Thereupon, cam surface 86 raises cam follower 121 and rotates the pawl 120 on pin 130 to disengage the pawl from teeth 128. The rotating element 110 then becomes stationary until motivated by fluid pressure forces caused by an approaching vane in a manner to be described hereinafter. It will be obvious that the opposite pawl 122 will be engaged and disengaged simultaneously with pawl 120 as it follows in recess 84 and engages cam surface 88 opposite surface 86.

Rotary element 210 contains pawls 230 and 232, as previously described. These two pawls likewise include cam followers (not shown) which follow the respective shoulder 106 adjacent recess 100 in end cap 22, and ride up the cam surfaces 102 and 104 to disengage pawls 230 and 232 from teeth 238. Cams 102 and 104 in the end cap are aligned with cam surfaces 86 and 88 when the end cap 22 is assembled onto the housing 20.

*Assembly*

The assembly of the form of the inventive engine illustrated is substantially as follows. The pawls are first installed in the respective rotary elements. Next, the two rotary elements are rotatably mounted upon the shaft. One end of the shaft is then inserted through opening 50 in the housing so that the rotary elements are located inside the housing chamber and extend from the one end wall to the other end wall and across the internal diameter of chamber 30 to define four closed power chambers therebetween. Next, end cap 22 is bolted into place. A suitable spark plug is inserted. When assembled, cam surfaces 86 and 104 will be aligned across the chamber 30, as will cams 88 and 102. They are specifically oriented to cause each rotor to be disengaged from the shaft when one vane is adjacent end 72 of the catch so that the vane can move slightly to the rear to engage with end 72 and remain there temporarily. The cams must also allow each rotor to be re-engaged with the shaft when the other rotor is disengaged and just when end 78 is retracted out of the chamber by depression of end 72 so that end 78 will not obstruct the vane opposite the driven vane.

Operation

Figure 13:
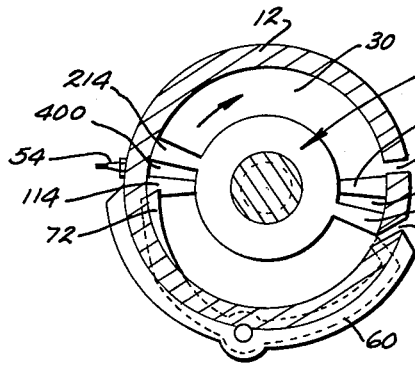
FIG. 13 is a sectional view of the engine taken on plane XIII—XIII of the engine illustrated in FIG. 1 showing the position of the engine components just prior to a firing and explosion step in the operational cycle.
Figure 14:
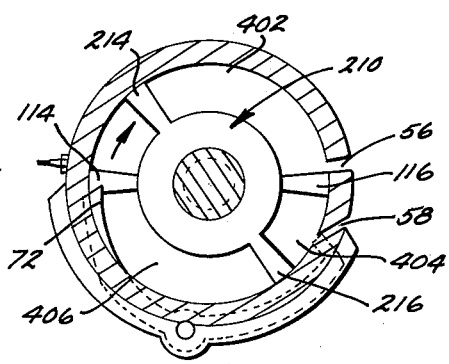
FIG. 14 illustrates the engine in FIG. 13 just after the firing step.

The operation of the device will be understood from a study of FIGS. 13 through 18 which represent the first two of the four power strokes occurring in one complete cycle of the engine. FIG. 13 shows the engine components in their positions just prior to an explosion for one of the four power strokes. Rotary element 210, and element 110 therebehind, are shown with the respective vanes 214 and 216 on element 210 and vanes 114 and 116 on element 110. It will be noted that end 72 of control means 60 is shown protruding into chamber 30. End 72 is engaged with one of the recesses 300 in wing or vane 114 as shown. Assuming that an explosive mixture of air and fuel are compressed between vanes 114 and 214, spark plug 54 is then fired to explode the mixture in this power chamber 400. Vane 114 is prevented from rotating counterclockwise due to its positive engagement with restraining end 72, thereby causing vane 114 to act temporarily as an abutment means. The explosive force thus drives vane 214 in a clockwise direction. Since pawls 230 and 232 are engaged with ratchet teeth 238, the rotation of the rotary element 210 in a clockwise direction causes the shaft to be driven in a clockwise direction. As vane 214 rotates clockwise, it simultaneously drives ahead of it exhaust gases (from a previous firing) from power chamber 402 out exhaust port 56. Vane 216 on the opposite side of the rotary element simultaneously sucks a mixture of fuel and air through inlet port 58 into chamber 404 formed between vane 116 and vane 216. Also, simultaneously the mixture of air and fuel in power chamber 406 between vanes 114 and 216 is compressed to prepare it for the next power stroke.

Figure 15:
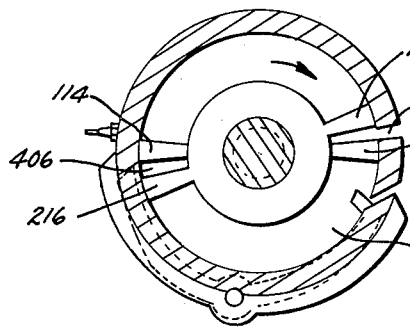
FIG. 15 is the sectional view of the engine shown in FIG. 13 after the completion of the power stroke caused by the explosion in FIG. 14.

In FIG. 15, the vane 214 is approaching the exhaust port 56 at the completion of its power stroke. It should be noted that during the last part of this stroke, the compression of the fuel and air mixture in chamber 406 between vanes 114 and 216 becomes quite large, and the explosive force behind vane 214 is relatively small such that rotary element 210 tends to stop in a position prior to that shown in FIG. 15. This would be undesirable since the vane to serve as the next abutment would not pass and catch on end 72. To remedy this, the already rotating shaft 16 pulls the rotary element around the last several degrees due to the pull type action at surface 160 explained with respect to FIG. 7. This prevents it from hanging-up in an undesirable position. When vane 216 reaches the position shown in FIG. 15, it depresses restraining end 72 against its biasing spring 74 (FIG. 3) to force end 78 into the chamber 30 and into the path of vane 116. The compressive forces in chamber 406 because of the advancement of vane 216 cause vane 114 to rotate from its position in contact with end 72 to the position shown in FIG. 15. This continues to the position shown in FIG. 16. During this interval (FIGS. 15 and 16) it is to be understood that the rotary element containing vanes 114 and 116 has been disengaged from the shaft as vane 114 passes end 72. Vane 116 then contacts projecting end 78 for a brief moment to halt the rotary element and assure the proper setting of opposite vane 114 prior to the next firing and explosion. It will be noted that if vane 114 were allowed to continue, it would move partially around its rotative path prematurely and thus cause the explosion to be largely ineffective.

Figure 16:
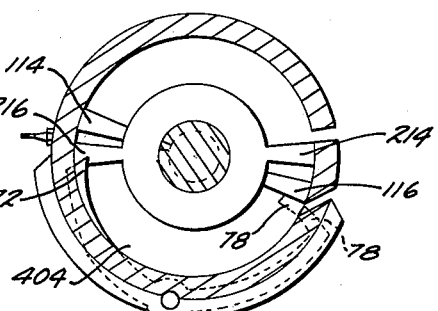
FIG. 16 is the engine illustrated in FIG. 13 just prior to a second explosion and power stroke.

As soon as the rotary element containing vanes 114 and 116 is set in its proper position, the vane 216 passes end 72 whereby its biasing spring forces it outwardly, as shown in FIG. 16, and thus simultaneously forces end 78 into its recessed position rather than its protruding position shown in phantom in FIG. 16. As vane 216 reaches this position, cam followers on pawls 230 and 232 engage cam surfaces 102 and 104 to disengage the pawls from the teeth 238, and as vane 114 reaches the position shown in FIG. 16, pawls 120 and 122 are allowed to engage teeth 128. The engine is then ready for the next power stroke.

Figure 17:
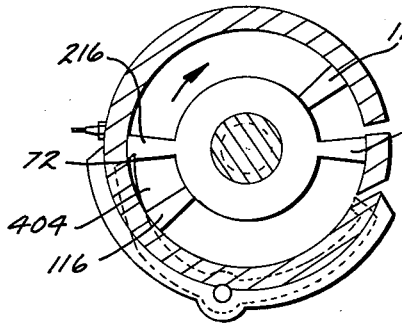
FIG. 17 is the engine illustrated in FIG. 13 near the completion of the second power stroke.
Figure 18:
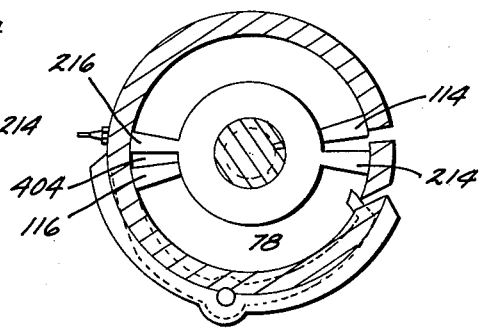
FIG. 18 is the engine illustrated in FIG. 13 at the completion of the second power stroke, and just prior to the third power stroke.

Referring now to FIG. 17, the explosion has occurred and vane 114 has been driven most of the way around the semi-circular path. Vane 114 has driven out exhaust gases, vane 116 has sucked in a new mixture of fuel behind it, and has compressed the fuel mixture ahead of it. When the rotary element containing vanes 114 and 116 reaches the position shown in FIG. 17, it tends to hesitate due to the compression of gases in chamber 404. Since the pawls engage in a pulling manner upon the shaft, the power previously imparted to the shaft serves to pull the teeth and thus rotary element 110 around to the position shown in FIG. 18 where the pawls again are disengaged from the shaft. Vane 116 depresses end 172 (FIG. 18) in a manner similar to that described with respect to FIG. 15, such that advancing vane 214 forced around slightly by the compressed gases in chamber 404 contacts end 78 to thereby set rotor 210 for the next power stroke. Thereupon the power stroke similar to that described with respect to FIG. 13 again repeats itself except that vane 216 is now ready to travel as the driven element whereas vane 214 was the driven element in FIG. 13. It will thus be appreciated that the engine is capable of four power strokes for each complete revolution of the rotary elements. The remaining two power strokes are obvious from the explanation of the first two. Each 360° revolution of the vanes causes two revolutions of the shaft. It will also be understood that the power stroke of each element causes a simultaneous exhaust of the gases from the previous explosion, intake of the new mixture of fuel and air for future explosion. In order to obtain spark plug firing at the proper time, a suitable set of points (not shown) may be connected to shaft 62. Thus, when a vane passes end 72 and allows it to return to its catch position, the rotation of shaft 62 will cause the plug to fire (e.g. FIG. 16) and explode the fuel mixture.

Arrangement in Series

If desired, the novel engine may be arranged in a series with a group of such engines. For this purpose they may all be mounted upon shaft 16 in an axial arrangement. In order to time the several engines to obtain consecutive firings, a depressible element 500 (FIGS. 3 and 4) may be mounted on shaft 502 to protrude into chamber 30 at the bottom. Then when the driven rotor is half way through its travel at the top of the housing, its counterpart vane will be at the bottom of the housing to depress lever 500 and simultaneously cause an explosion in the adjacent engine. Obviously, this timing is variable and can be regulated to suit the number of engines used.

The advantages of the unique engine are manifold. It uses no delicate supplemental abutments, but rather actually uses the successive vanes themselves as abutments. It is relatively simple in structure and therefore superior from the standpoint of the design engineer, the production engineer, the repairman, and the user. It enables four power strokes per each complete revolution or cycle of the vanes (two shaft revolutions), thus achieving high volumetric efficiency in spite of its utter simplicity. It possesses no high speed reciprocating parts. It involves no oscillating rotor with the resulting vibrational disadvantages. It presents no surfaces difficult to machine. It is readily adaptable to plural installation. Various modifications of the inventive engine illustrated and described will occur to those in the art without departing from the spirit of this invention. Therefore, the invention is

I claim:

1. A rotary engine comprising: a cylindrical housing including end walls; a shaft extending through the axial center of said housing; inlet and exhaust ports in said housing; a first hub rotatably mounted on said shaft; a second hub axially positioned adjacent said first hub and rotatably mounted on said shaft; oppositely oriented radially extending vanes on each of said hubs, with the vanes on said first hub protruding axially toward and overlapping said second hub and extending to the end wall adjacent said second hub, and with the vanes on said second hub protruding axially toward and overlapping said first hub and extending to the housing end wall adjacent said first hub whereby variable volume chambers are formed between successive vanes, the wall of the housing and the hubs; and a vane movement control element pivotally mounted in said housing and having ends which alternately intersect the path of the rotating vanes, one end serving as a catch means to lock a vane against reverse movement under an explosive force, and the other end alternately restraining forward movement temporarily of a vane to be driven by an explosive force until the adjacent vane is locked against rearward movement prior to an explosion.

2. The apparatus in claim 1 wherein said pivotal vane movement control element includes a timing shaft mounted thereto and adapted to pivot therewith to control the firing of the engine with pivotal movement of said control element.

3. A rotary engine comprising: a cylindrical housing including end walls; a shaft extending through the axial center of said housing; inlet and exhaust ports in said housing; a first hub rotatably mounted on said shaft; a second hub axially positioned adjacent said first hub and rotatably mounted on said shaft; oppositely oriented radially extending vanes on each of said hubs, with the vanes on said first hub protruding axially toward and overlapping said second hub and extending to the end wall adjacent said second hub, and with the vanes on said second hub protruding axially toward and overlapping said first hub and extending to the housing end wall adjacent said first hub whereby variable volume chambers are formed between successive vanes, the wall of the housing and the hubs; means for holding the vanes on said first hub stationary while the second hub and its vanes rotate and for holding the vanes on said second hub stationary while the first hub and its vanes rotate; and ratchet drive means between said first hub and said shaft and between said second hub and said shaft; and camming means in the inner end walls of said housing capable of disconnecting said ratchet drive between said first hub and said shaft and between said second hub and said shaft.

4. The apparatus as defined in claim 3 wherein said ratchet drive means is a positive connection capable of driving said shaft by a force imparted to one of said hubs and also of driving said hub by a force imparted to said shaft thereby enabling said engine to be started by external force.

5. The apparatus as set forth in claim 3 wherein said ratchet drive means includes a plurality of pawls mounted rotatably in each of said hubs and a plurality of ratchet means in the periphery of said shaft, said pawls being capable of engaging with said ratchet teeth such that rotating forces on said hub will drive said shaft and such that rotating forces on said shaft will drive said hub thereby providing a compact engine which can be externally started by rotation of the shaft.

References Cited in the file of this patent

UNITED STATES PATENTS

| | | |
|---|---|---|
| 632,969 | Piening | Sept. 12, 1899 |
| 1,224,642 | Holmes | May 1, 1917 |
| 1,273,380 | Kuhn | July 23, 1918 |
| 1,879,422 | Nash | Sept. 27, 1932 |
| 2,088,779 | English | Aug. 3, 1937 |